US008672102B2

(12) United States Patent
Walters et al.

(10) Patent No.: US 8,672,102 B2
(45) Date of Patent: Mar. 18, 2014

(54) BRAKE SYSTEM FOR A MOTOR VEHICLE

(75) Inventors: Mark Walters, Royal Oak, MI (US);
Stephen T Lim, Farmington Hills, MI
(US); Kirt M Bennett, Linden, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1037 days.

(21) Appl. No.: 10/741,760

(22) Filed: Dec. 19, 2003

(65) Prior Publication Data
US 2004/0159505 A1    Aug. 19, 2004

Related U.S. Application Data

(60) Provisional application No. 60/435,373, filed on Dec. 20, 2002.

(51) Int. Cl.
*F16D 65/00* (2006.01)
*F16D 65/14* (2006.01)

(52) U.S. Cl.
USPC .................... 188/218 R; 188/18 A; 188/73.1; 188/218 XL

(58) Field of Classification Search
USPC ............ 188/17, 18 R, 18 A, 24.11–24.13, 26, 188/73.1, 73.31, 72.4, 152, 218 R, 218 XL; 303/9.64; 280/264; 301/6.1, 6.8
See application file for complete search history.

(56) References Cited

U.S. PATENT DOCUMENTS

| 3,405,784 | A | * | 10/1968 | Henry-Biabaud | 188/18 A |
| 3,709,561 | A | * | 1/1973 | De Biasse et al. | 301/6.8 |
| 3,788,429 | A | * | 1/1974 | Brooks et al. | 188/18 A |
| 4,123,079 | A | * | 10/1978 | Biskup | 280/87.042 |
| 4,282,952 | A | * | 8/1981 | Bartley | 188/18 A |
| 4,465,322 | A | * | 8/1984 | Hayashi | 303/9.64 |
| 4,535,866 | A | * | 8/1985 | Shiga | 180/215 |
| 4,662,482 | A | * | 5/1987 | Bass | 188/18 A |
| 4,697,825 | A | * | 10/1987 | Hayashi et al. | 280/276 |
| 4,716,993 | A | * | 1/1988 | Bass | 188/18 A |
| 4,756,379 | A | | 7/1988 | Kawano et al. | |
| 4,770,435 | A | * | 9/1988 | Cristie | 280/279 |
| 4,828,069 | A | | 5/1989 | Hatsuyama | |
| 4,890,857 | A | | 1/1990 | De Cortanze | |
| 5,273,346 | A | * | 12/1993 | Tsuchida et al. | 303/2 |
| 5,538,270 | A | * | 7/1996 | Gajek et al. | 280/264 |
| 5,593,005 | A | * | 1/1997 | Kullmann et al. | 188/72.4 |
| 5,611,555 | A | | 3/1997 | Vidal | |
| 5,826,682 | A | * | 10/1998 | Goettker | 188/72.4 |
| 6,328,121 | B1 | | 12/2001 | Woodbury et al. | |
| 6,390,566 | B1 | * | 5/2002 | Matsuno | 303/9.64 |

* cited by examiner

*Primary Examiner* — Melody Burch
(74) *Attorney, Agent, or Firm* — Ralph E. Smith

(57) ABSTRACT

An improved brake system is provided for a motor vehicle. The system includes a rotor attached to a rim of a wheel and a caliper assembly mounted to a hub of the wheel. The caliper is arranged to retain a friction element and operatively engage the friction element against the rotor.

8 Claims, 4 Drawing Sheets

BRAKE SYSTEM FOR A MOTOR VEHICLE

CROSS REFERENCE TO RELATED APPLICATION(S)

This application claims the benefit of U.S. Provisional Application No. 60/435,373 filed on Dec. 20, 2002.

FIELD OF THE INVENTION

The present invention relates generally to a brake system for a motor vehicle and, more particularly, to a brake system arrangement for a four wheel motorcycle type vehicle.

BACKGROUND OF THE INVENTION

Generally, motorcycles and all terrain vehicles, commonly referred to as ATV's, typically include two, three and four wheel configurations. In the three and four wheel configurations, adjacent wheels are typically spaced apart to span the width of the vehicle and also share a common axle. Spacing apart the wheels also provides the ability to mount suspension and brake components to a common axle housing or to a wheel hub support structure located on an axle side of the wheel. In addition, conventional motorcycles often utilize a fork arranged where brake componentry can then be attached to the fork.

However, in a four wheel motorcycle type vehicle of narrow width and including an independent suspension system, a fork style frame arrangement is not available, and the spacing of the wheels may not provide enough space to mount brake components between the wheels. Therefore, typical brake systems with conventional mounting arrangements are not well suited for a four wheel motorcycle of narrow width that does not utilize a conventional fork arrangement for supporting the front wheels.

Thus, there is a need for a brake system for a narrow width four wheel vehicle that overcomes the aforementioned and other disadvantages.

SUMMARY OF THE INVENTION

Accordingly, an improved brake system is provided for a motor vehicle. In accordance with one aspect of the present invention, the brake system includes a rotor attached to a rim of a wheel and a caliper assembly mounted to a hub of the wheel. The caliper is arranged to retain a friction element and operatively engage the friction element against the rotor.

In accordance with another aspect of the present invention, the brake system further includes a master brake cylinder mounted to a steering mechanism base plate arranged to rotate with the steering mechanism.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENT

Figure 1:
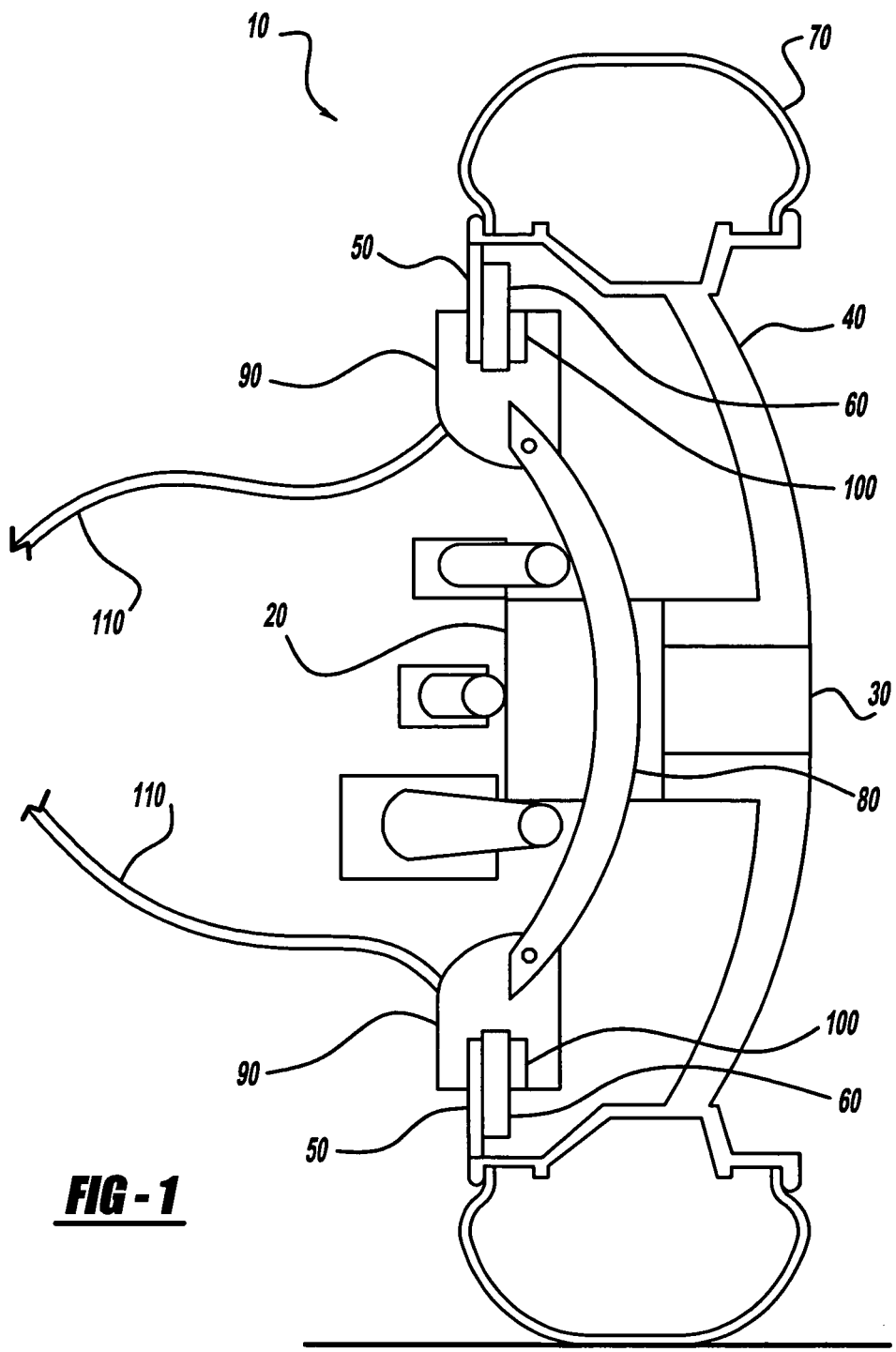
FIG. 1 illustrates a front view of a section of a brake system for a front tire in accordance with the present invention.

Referring now to the drawings, FIG. 1 illustrates an exemplary embodiment of a brake system 10 for a wheel of a four wheel motorcycle type vehicle in accordance with the present invention. Brake system 10 includes a central knuckle and hub assembly 20 which includes a front wheel spindle 30 for supporting a front wheel 40. Front wheel 40 further includes a plurality of rotor clips 50 for attaching rotor 60 to wheel 40 at a radial outboard edge of rotor 60. Front wheel 40 also supports tire 70 in a convention manner as is known in the art.

Hub assembly 20 further includes a mounting bracket 80 extending substantially vertically from hub assembly 20 for mounting and supporting brake calipers 90. Brake calipers 90 house friction elements 100 which operatively engage rotor 60 via hydraulic pressure from brake fluid lines 110.

Figure 2:
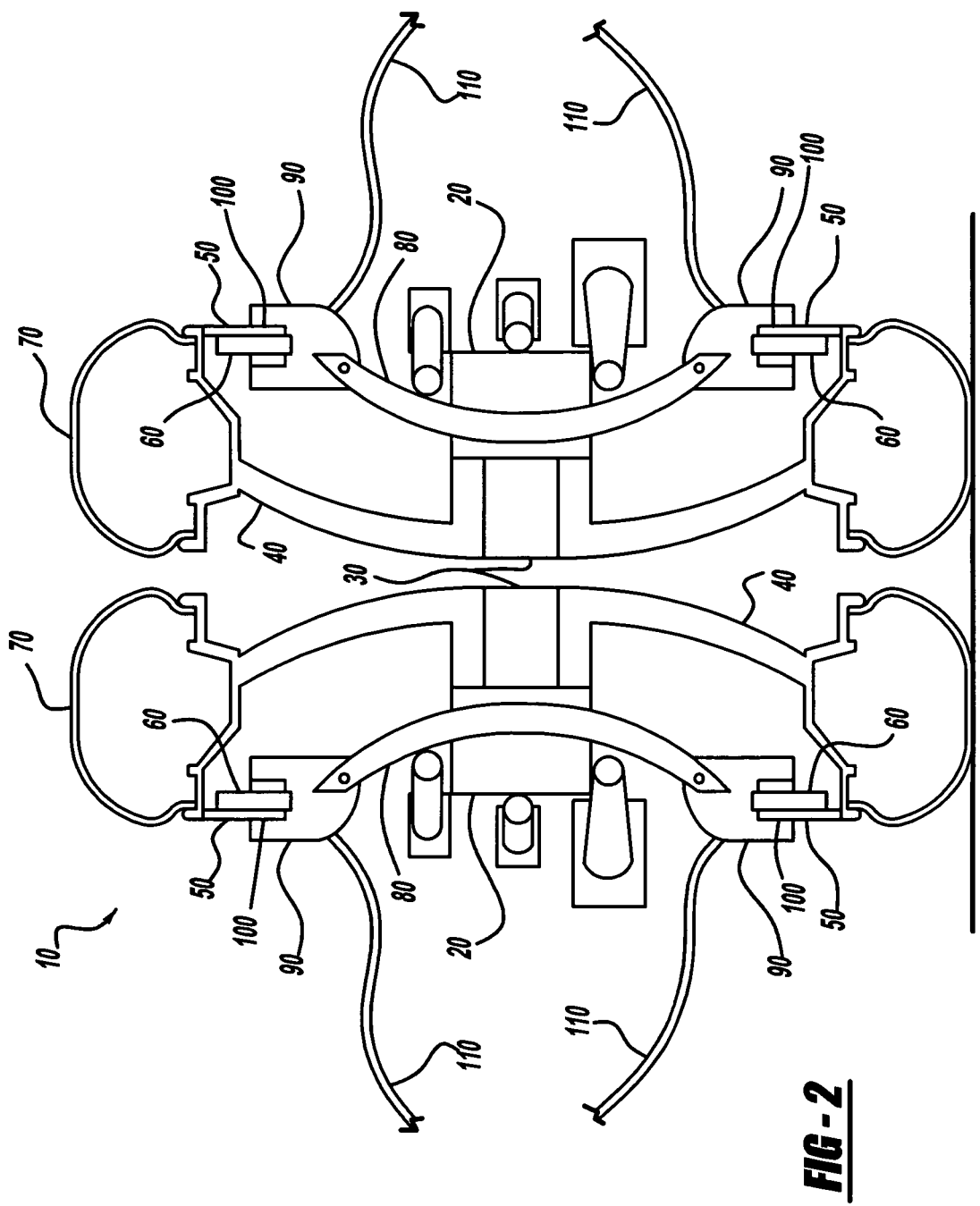
FIG. 2 illustrates a front view of the section shown in FIG. 1 for both front tires of a four wheel motorcycle type vehicle in accordance with the present invention.

FIG. 2 shows the brake system 10 of FIG. 1 for both front tires of an exemplary embodiment of a four wheel motorcycle type vehicle in accordance with the present invention. It should be appreciated that the close proximity of the wheels to each other precludes packaging of a brake system on an inside (axle side) of each front tire. In addition, a conventional type fork arrangement with a solid axle between the forks would not provide for the capability of an independent front suspension system. Therefore, the brake system configuration in accordance with the present invention provides a hub mounted caliper that is arranged to engage a rotor attached to an axially outboard edge of the wheel. Such an arrangement provides design flexibility so that the calipers and rotor can be located solely on an outward face of the wheel.

Figure 3:
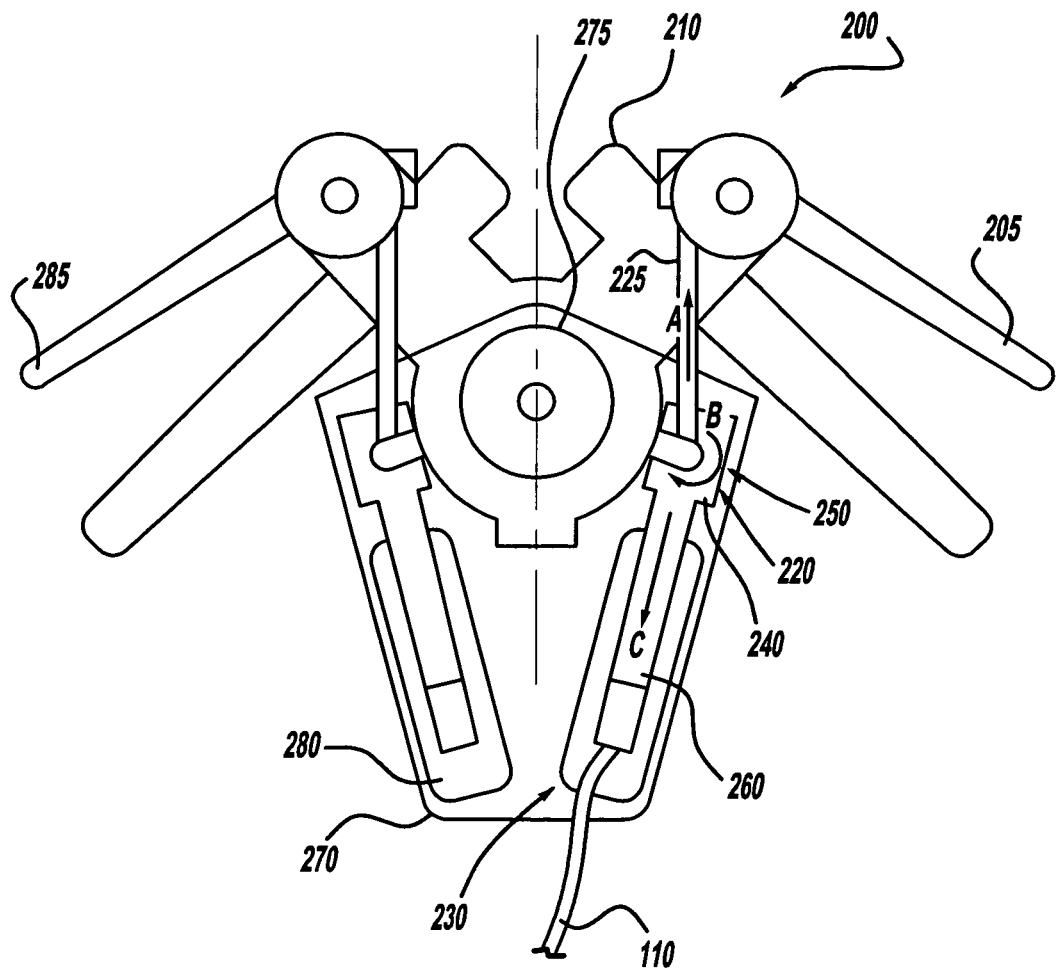
FIG. 3 illustrates a top view of an actuation mechanism and a master brake cylinder mounted to a handle bar attachment plate in accordance with the present invention.
Figure 4:
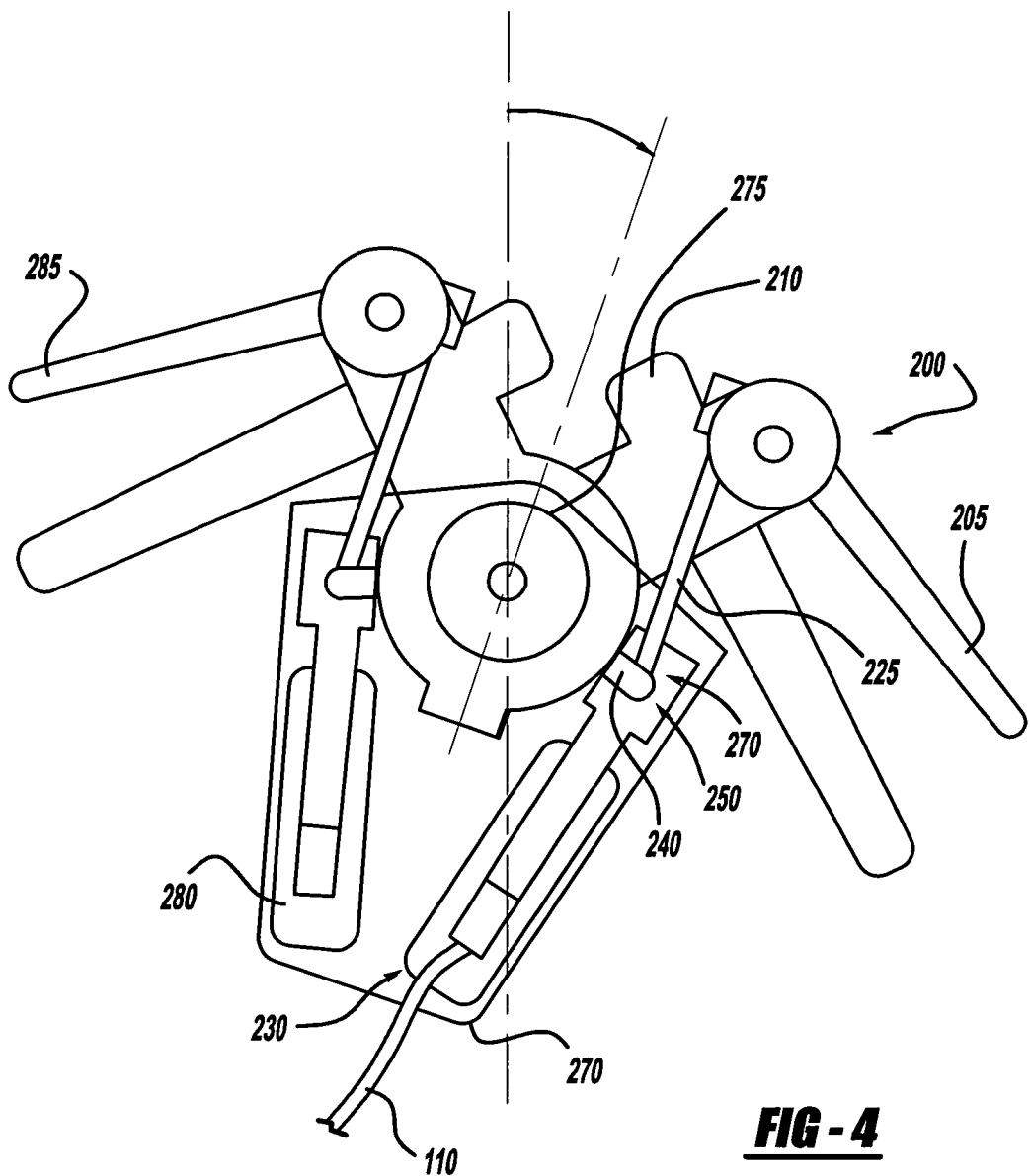
FIG. 4 illustrates a top view of FIG. 3 when the handle bar assembly is in a turning condition in accordance with the present invention.

Referring now to FIGS. 3 and 4, a brake master cylinder arrangement and actuation mechanism 200 is shown in accordance with the present invention. The arrangement includes a brake lever 205 pivotably connected to handle bar assembly 210 and operably coupled through mechanical linkage assembly 220 to master brake cylinder assembly 230. Mechanical linkage assembly 220 includes a linking member 225 pivotably connected to brake lever 205 and bell crank 240. Bell crank 250 is pivotably connected at one end to bell crank 240 and at the other end to master cylinder piston 260. Master cylinder 260 is attached to a handle bar mounting plate 270 that is attached to the base of a handle bar shaft 275 that rotates with the handle bar assembly 210 as represented by the arrow in FIG. 4. Mounting the brake master cylinder to the handle bar mounting plate 270 as opposed to conventional mounting on the handle bars, provides for protection of the master cylinder and accompanying fluid lines from the elements as well as for greater design flexibility for the handle bars.

In operation, brake lever 205 is drawn towards handlebar assembly 210 via driver input. This in turn draws linking member 225 in the direction of arrow A which rotates bell crank 240 in the direction of arrow B. The rotation of bell crank 240 in turn rotates bell crank 250 causing it to act as a lever arm and compress piston 260 into master cylinder assembly 230 in the direction of arrow C and displace a corresponding amount of brake fluid through brake fluid line 110. The hydraulic pressure of the displaced brake fluid operates to compress friction elements 100 against rotor 60 which is attached to and rotates with wheel 40.

Likewise, as also shown in FIGS. 3 and 4, a similar cylinder arrangement 280 can be actuated by lever 285 to operate a hydraulic clutch arrangement (not shown) for shifting of transmission gears during operation of the vehicle.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A vehicle brake system comprising:
    a first wheel including a first concave surface disposed on an outboard side of the first wheel, a first convex surface disposed on an inboard side of the first wheel, a first hub providing an axis of rotation for the first wheel, and a first tire-supporting portion, the first concave surface and the first convex surface extending between and connecting the first tire-supporting portion and the first hub;
    a second wheel disposed adjacent to the first wheel and including a common axis of rotation, the second wheel further including a second concave surface disposed on an outboard side of the second wheel and a second convex surface disposed on an inboard side of the second wheel, the second concave surface and the second convex surface extending between and connecting a second tire-supporting portion and a second hub, the second convex surface opposing the first convex surface;
    a first rotor attached to the first wheel proximate to a first axially outboard edge of the first wheel and disposed adjacent to the first tire-supporting portion;
    a first caliper assembly arranged to retain and operatively engage a first friction element against the first rotor;
    a second rotor attached to the second wheel proximate to a second axially outboard edge of the second wheel and disposed adjacent to the second tire-supporting portion; and
    a second caliper assembly arranged to retain and operatively engage a second friction element against the second rotor.

2. The vehicle brake system of claim 1, wherein the first friction element includes a plurality of friction elements and wherein the first caliper assembly is arranged to retain and engage a respective one of the friction elements against each of an outward and inward face of the first rotor.

3. The vehicle brake system of claim 1, wherein the brake system further comprises a master brake cylinder mounted to a base plate of a steering mechanism arranged to rotate with the steering mechanism.

4. The vehicle brake system of claim 3, wherein the steering mechanism comprises a handle bar coupled to a rotateable shaft, the base plate being coupled to rotate with the shaft, and wherein the brake system further comprises a brake actuation lever mounted to the handle bar and coupled to the master brake cylinder.

5. The vehicle brake system of claim 1, wherein the first rotor extends away from the first axially outboard edge and toward the first concave surface.

6. The vehicle brake system of claim 1, wherein the first wheel includes a first tire and the second wheel includes a second tire respectively supported by the first tire-supporting portion and the second tire-supporting portion.

7. The vehicle brake system of claim 6, wherein the first tire opposes the second tire.

8. The vehicle brake system of claim 1, wherein the second rotor extends away from the second axially outboard edge and toward the second concave surface.

\* \* \* \* \*